United States Patent [19]
Szekely

[11] 3,958,980
[45] May 25, 1976

[54] PROCESS FOR REMOVING ALKALI-METAL IMPURITIES FROM MOLTEN ALUMINUM

[75] Inventor: Andrew Geza Szekely, Yorktown Heights, N.Y.

[73] Assignee: Union Carbide Corporation, New York, N.Y.

[22] Filed: Nov. 8, 1974

[21] Appl. No.: 522,143

[52] U.S. Cl. ............................ 75/68 R; 75/93 E
[51] Int. Cl.² ................................. C22B 21/06
[58] Field of Search ............. 75/68 R, 93 R, 93 AC

[56] References Cited
UNITED STATES PATENTS

3,839,019  10/1974  Bruno et al. .................. 75/68 R

Primary Examiner—M. J. Andrews
Attorney, Agent, or Firm—Saul R. Bresch

[57] ABSTRACT

A process for removing alkali metal impurities from molten aluminum while avoiding the emission of environmentally harmful gases and fumes. The process comprises introducing a sparging gas comprising a mixture of an inert gas and a gas selected from the group consisting of chlorine, fluorine, halogen-containing compounds and mixtures therefor into unalloyed molten aluminum while maintaining the concentration of halogen in the sparging gas at a value intended to selectively halogenate the alkali metal impurities at a sufficiently high utilization such that the concentration of chloride in the effluent gas is maintained below a predetermined permissible limit.

8 Claims, 4 Drawing Figures

PROCESS FOR REMOVING ALKALI-METAL IMPURITIES FROM MOLTEN ALUMINUM

BACKGROUND

The invention relates, in general, to refining molten aluminum and, more particularly, to a method for removing alkali metal impurities from molten aluminum with a halogen-containing gas while substantially avoiding the emission of corrosive or environmentally harmful gases and fumes.

Akali metals and calcium are, for the most part, harmful impurities in aliminum alloys having commercial use. Sodium is especially harmful if the hydrogen content of the alloy has not been sufficiently reduced by degassing, or the finished metal product contains magnesium. Thus, it is generally considered necessary that the sodium content in an aluminum alloy containing more than about 1% magnesium be kept below 0.0005% sodium if fabrication defects, such as edge cracking, are to be avoided during hot rolling. The presence of lithium in aluminum is also undesirable because it enhances the corrosion of aluminum foils by moist air.

Alkali metals enter aluminum in the reduction cells during electrolytic reduction of alumina in the presence of cryolite. The resulting primary aluminum is thereafter generally transferred to the cast house, where the desired alloying constituents such as magnesium are added to the melt in a mixing furnace. The alloyed metal is subsequently fluxed with chlorine to reduce its concentration of hydrogen and alkali metal impurities. The treated molten alloy is then cast into ingots.

The traditional methods of removing alkali metals from aluminum on a commercial scale fall into one of three categories: (1) holding the metal in the molten state for an extended period of time; (2) solidifying the metal by casting it into ingots and remelting same; and (3) chlorine fluxing the molten metal with chlorine, chlorine-nitrogen mixtures or with halide-containing salts at the casting station after the addition of the desired alloying constituents. The reduction of the alkali metal content of aluminum during holding or remelting operations is attributable to the high affinity of these impurities toward oxygen, and to the fact that the solubility of sodium in solid aluminum is extremely low. During the conventional chlorine fluxing of aluminum alloys, the sodium content of the metal is reduced by the chemical reaction between sodium and chlorine.

Although all of the above-described methods are successful to varying degrees in removing sodium from aluminum melts, they nevertheless, have serious disadvantages insofar as the cost and efficiency of the overall refining operation is concerned. Holding the metal in the molten state, for example, is both time consuming as well as ineffective in reducing the alkali content of the melt to the very low levels desired in the finished product, since the partial pressure of these impurities over molten aluminum is very low. Casting the metal into ingots and remelting the metal is similarly inefficient with respect to time and energy demands. Consequently, primary aluminum is normally transferred from the reduction plant to the cast house in the molten state rather than in the solid state.

Chlorine fluxing of the molten alloyed metal at the casting station has several serious drawbacks. One serious disadvantage is associated with the emission of corrosive and toxic gases and fumes. This undesirable emission consists mainly of unreacted chlorine, aluminum chloride, hydrochloric acid mist and aluminum oxide fume, the latter two compounds being produced by hydrolysis from the aluminum chloride gas. Consequently, the general use of chlorine for removing hydrogen and other impurities from aluminum alloys is being restricted by pollution control legislation, with the result that greater emphasis is being placed on non-polluting refining methods such as, sparging the metal with an inert gas, or by molten metal filtration techniques such as described in U.S. Pat. Nos. 3,737,303 and 3,373,304.

The second disadvantage of removing sodium with chlorine or with halide-containing salts relates to the fact that in magnesium-containing alloys the reaction of chlorine with magnesium is favored relative to that with sodium, particularly at low sodium concentrations. The high affinity of chlorine toward magnesium causes serious difficulties in producing acceptable quality metal, especially in high magnesium alloys where a low sodium level is specifically desired to avoid edge cracking. Thus, large amounts of chlorine must be reacted with these alloys, far in excess of that required for the stoichiometric removal of sodium, in order to reach the very low levels of sodium which are desired. This excess chlorine is not only wasted but is directly responsible for the emission of pollutants and for the loss of magnesium from the alloy. The costly loss of magnesium is inherent in all of the presently known sodium removal processes irrespective of whether the fluxing of the alloy is performed with halogen gases or with halide-containing salts. Therefore, it should be apparent that a refining operation which can readily remove alkali metals from aluminum with no appreciable metal loss, which avoids the wasteful use of chlorine and does not produce prohibitive amounts of atmospheric pollutants has numerous advantages over the present state of the art.

OBJECTS

Accordingly, it is an object of this invention to provide an efficient and economical process for removing alkali metal impurities from molten aluminum.

It is a further object of this invention to provide an economical process for selectively removing alkali metal impurities by sparging molten aluminum with a halogen-containing inert gas such that the concentration of halogen gas in the sparging gas is regulated to simultaneously achieve high alkali metal removal efficiency and prevent the generation of objectionable amounts of gaseous or solid pollutants.

SUMMARY OF THE INVENTION

The objects set forth above and others which will be readily apparent to those skilled in the art, are achieved by the present invention one aspect of which comprises:

a method of removing alkali metal impurities from aluminum while substantially avoiding the emission of environmentally harmful gases and fumes comprising the steps of:

1. providing a vessel for treating molten aluminum, said vessel being provided with inlet means for introducing gas into the molten aluminum and gas outlet means for withdrawal of the effluent gas from the vessel, 2. introducing molten aluminum prior to the addition of any alloying constituents thereto into said vessel,
3. introducing a sparging gas comprising a mixture of a gas selected from the group consisting of chlorine, fluorine, halogen-containing compounds and mixtures thereof, and a gas inert with respect to aluminum into the molten bath in the form of discrete well-distributed gas bubbles so that said gas bubbles come into intimate contact with substantially the entire mass of molten aluminum in said metal bath,
4. maintaining the concentration of halogen in said sparging gas at a value such that as the concentration of alkali metal impurities in the melt is progressively reduced the selective halogenation of said impurities relative to aluminum at any given level of alkali metal impurity is sufficiently high to restrict the concentration of aluminum halide in the effluent gas below a predetermined permissible limit, and
5. maintaining the flow of said sparging gas into said molten aluminum for a period of time sufficient to lower the concentration of alkali metal impurities in said aluminum to the desired level whereby said alkai metal impurities are removed as halides at a sufficiently high utilization of the halogens and halogen-containing compounds such that the effluent gas contains substantially no unreacted fluorine or chlorine and its concentration of aluminum halide is below the predetermined permissible limit.

An important feature of the present invention is that it accomplishes alkali metal removal by chlorination unencumbered by the two major disadvantages ordinarily associated with same. Thus, the chlorination reaction can be carried out under conditions most favorable to sodium removal, and with gas mixtures specifically controlled to restrict the concentration of aluminum chloride in the spent gas to below predetermined safe limits. Accordingly, in a preferred mode of the present invention the concentration of chlorine in the inert gas mixture is continuously decreased in response to the decreasing sodium content of the melt during the refining operation, such that at any given level of impurity, the gas mixture represents the optimum concentration with regard to maximizing the selective chlorination of sodium relative to aluminum while minimizing the quantity of inert gas required as a carrier gas.

The molten aluminum to be processed in accordance with the invention is aluminum metal containing alkali metal impurities in objectionable amounts but is essentially free of any alloying elements.

The sparging gas which is dispersed throughout the melt comprises a mixture of an inert gas and a halogen and/or a halogen-containing compound which is chemically reactive with alkali metals at molten aluminum temperature. Nitrogen and argon are the preferred inert gases while chlorine and fluorine are the preferred halogens. The term "halogen-containing compound" as used herein is intended to encompass those halogenated compounds which are either directly reactive with alkali metals or produce a halogen gas upon decomposition at molten alumimun temperature, such as, for example, $CCl_4$, $CHCl_3$, $C_2Cl_2F_4$ and $CCl_2F_2$.

Sparging gas requirements and other gas quantities are expressed throughout the specification in volumes measured at 70°F and 1 atm pressure. Gas compositions are given in volume percent (mole percent) or in mole fractions (mole fraction × 100 = Vol. %).

The term "stoichiometric ratio" characterizes the selectivity of chlorination with respect to sodium. If all the chlorine supplied in the sparging gas were to react with sodium according to the formula $Na + \frac{1}{2}Cl_2 = NaCl$, the stoichiometric ratio would be: $Na/Cl_2 = 2$, since 1 mole of chlorine removes 2 atoms of sodium. If a fraction of the chlorine supplied in the sparging gas is consumed by forming $AlCl_3$, the stoichiometric ratio becomes less than two.

The harmful emission from the aluminum treating vessel is characterized herein by the concentration of $AlCl_3$ gas in the effluent gas. Alternately, emission is also expressed in terms of "aluminum volatized" (metal in the form of $AlCl_3$) expressed as a percentage of aluminum metal treated. This latter quantity is calculated by multipying the volume of $AlCl_3$ emitted in the effluent gas in units of cubic feet/100 lbs of metal treated, by the conversion factor of 0.07 lb Al/cu.ft. $AlCl_3$. The term "aluminum volatized" is particularly useful when emission standards are defined as a function of metal processing rate; that is, when the permissible emission is related to the weight of metal processed.

DETAILED DESCRIPTION OF THE INVENTION

Figure 1:
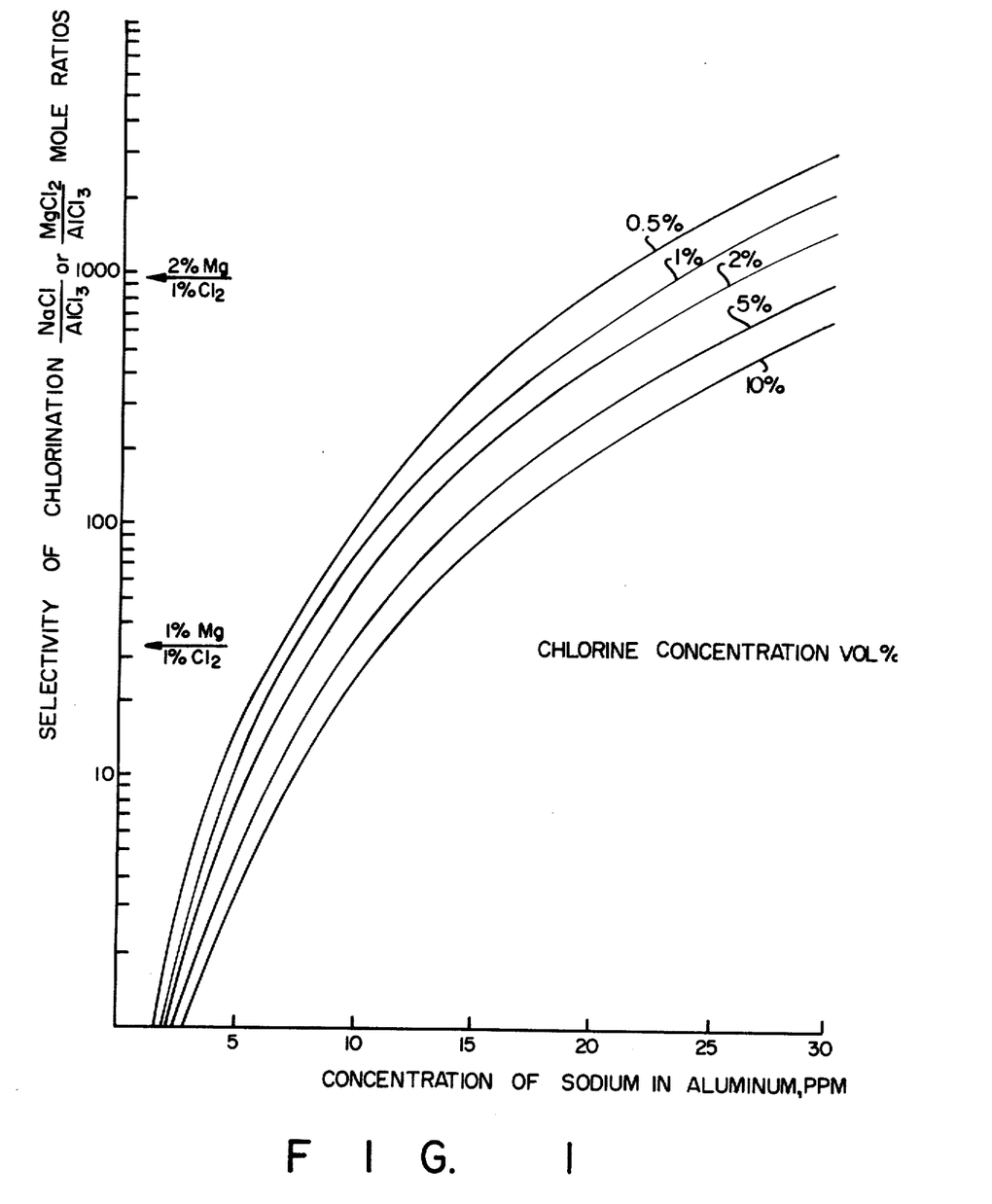
FIG. 1 is a plot of selectivity of chlorination of sodium in an aluminum melt vs. sodium concentration in the metal, as a function of the chlorine concentration in the sparging gas.
Figure 2:
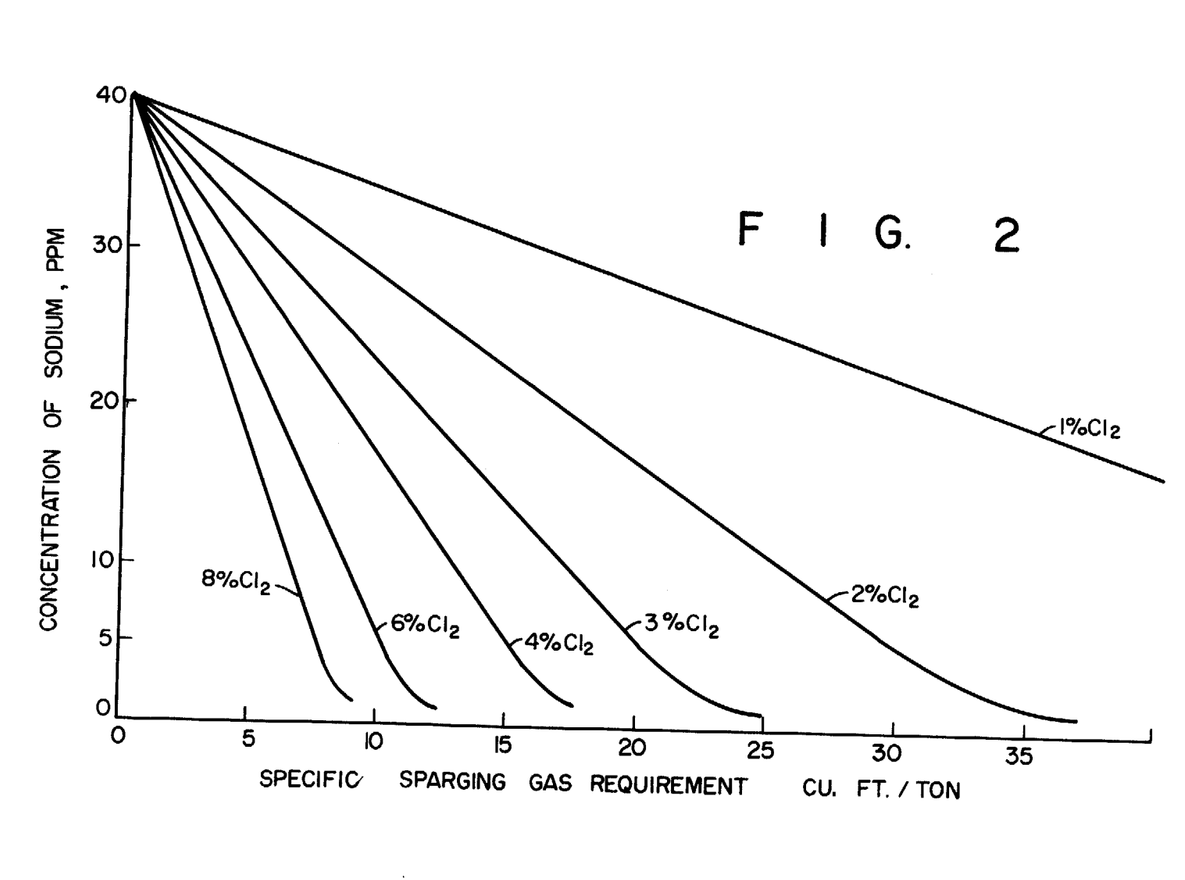
FIG. 2 is a diagram illustrating the volume of sparging gas needed to reduce the sodium concentration from 40 ppm to 1 ppm in 1 ton of aluminum as a function of the chlorine concentration in the sparging gas.

FIGS. 1 and 2 serve to illustrate and explain the principles involved in promoting the selective chlorination of alkali metals in molten aluminum in accordance with the inveniton. The vertical axis in FIG. 1 is a measure of the selective reaction of chlorine with sodium and aluminum at a temperature of 1000°K expressed in terms of the mole ratio of $NaCl/AlCl_3$ in the reaction products. The parametric curves in FIG. 1 represent gaseous mixtures used to sparge the melt having chlorine concentrations of 10 vol. % or less, the concentrations of interest for the present invention. As seen from the graph, chlorine reacts preferentially with sodium at high sodium concentrations, but this preference rapidly diminishes at low sodium concentrations. The process of the invention is predicated on the recognition that the decrease in selectivity of chlorination can be effectively off-set by decreasing the chlorine concentration in the sparging gas. Thus, a decrease of chlorine concentration from 10% to 1% improves the selectivity of chlorination of sodium by a factor of about 3. This improvement in selectivity is especially important at low concentrations of sodium. For example, at a sodium level of 5 ppm, approximately 4 atoms of sodium are removed from the melt per 1 atom of aluminum when sparging with a mixture containing 10% chlorine; for a sparging gas containing 1% chlorine, the NaCl/AlCl$_3$ ratio increases to approximately 11.

It is therefore apparent that by using low chlorine concentrations in the sparging gas, the removal of sodium from the melt is favored relative to aluminum resulting in an efficient utilization of chlorine while suppressing the formation of aluminum chloride gas. It must be emphasized, however, that the decrease of aluminum chloride concentration in the effluent gas with decreasing concentration of chlorine in the sparging gas is not simply a dilution effect, but is primarily due to the fact that at low concentrations chlorine preferentially reacts with sodium and therefore less aluminum chloride is formed.

FIG. 1 also underlines the problem inherent in the prior art practice of removing sodium in the presence of magnesium, usually by the injection of pure chlorine into the melt. The selectivity of chlorination of magnesium relative to aluminum is illustrated in FIG. 1 at two magnesium concentrations in the melt. A sparging gas containing 1% chlorine is assumed in order to provide a basis of comparison with the selective chlorination of sodium relative to aluminum in accordance with the present invention when using the same gas mixture. The two horizontal lines pointing toward the vertical axis in FIG. 1 indicate the ratio of MgCl$_2$/AlCl$_3$ in the product of chlorination if an aluminum melt containing 1% or 2% magnesium is blown with a 1% chlorine mixture. A comparison of these two lines with the curve drawn for 1% chlorine shows that magnesium is preferentially chlorinated in these alloys relative to sodium at the low sodium concentrations of practical interest, namely, at less than about 10 ppm sodium in the melt. Thus, from FIG. 1 it is evident that in a 2% magnesium-aluminum alloy, the MgCl$_2$/AlCl$_3$ is larger than the corresponding NaCl/AlCl$_3$ ratio at sodium concentrations below 24 ppm. That is to say, at very low sodium concentrations, practically all the chlorine is consumed by forming magnesium chloride and only a negligible fraction of it is available to react with sodium. Similarly, in a 1% magnesium-aluminum alloy, chlorine starts to prefer magnesium over sodium at sodium concentrations below 16 ppm. For example, the preference of chlorine in a 1% mixture to combine with 1% magnesium in the metal is about 30 times greater than its preference to combine with 5 ppm sodium. This is evident from the relative magnitudes of the corresponding ratios of the halides formed — 330 versus 11 as indicated in FIG. 1 at the above-mentioned concentrations. These figures underscore the importance of the present invention in that, contrary to prior art practice, sodium is removed from aluminum in the absence of magnesium (and other similar chlorine-affine elements) i.e. before alloy additions are made to the metal. This is especially important in cases where an extremely low alkali metal impurity level is required in the product metal.

FIG. 2 graphically illustrates the amount of sparging gas which is required to decrease the sodium concentration from 40 ppm to 1 ppm in aluminum as a function of the chlorine concentration in the sparging gas. At high concentrations of chlorine in the sparging gas, the gas requirement (expressed in cu. ft/ton) is relatively small while at low chlorine concentrations, the gas requirement is relatively large. This is due to the fact that more sparging gas is required to supply the requisite amount of chlorine for sodium removal from a dilute gas mixture than from a more concentrated mixture. However, the more concentrated the gas mixture, the lower the selectivity of chlorination (as shown in FIG. 1) and hence the greater the emission of aluminum chloride in the spent gas. Therefore, the optimum concentration of chlorine in the sparging gas must be chosen in such manner as to minimize the total gas usage (both chlorine and inert gas carrier) while maintaining the selectivity of chlorination sufficiently high so that the concentration of aluminum chloride in the effluent gas is always below the allowable emission limit.

The following example illustrates one particular embodiment of the invention according to which objectionable amounts of alkali metal impurities are removed from aluminum by using a sparging gas of fixed chlorine concentration throughout the process. The chlorine concentration was chosen in such a manner that the emission of aluminum chloride from the melt is kept below a permissible limit. The concept of selective chlorination of sodium and the changes occurring in the system as the sodium concentration in the melt progressively decreases is illustrated by data taken from a computer program which was constructed to follow the process path and to supply all pertinent data at every stage of the sparging process.

EXAMPLE 1

Molten aluminum containing 40 ppm sodium is introduced into a treating vessel before any alloy addition is made to the metal to reduce its sodium content to 1 ppm. The permissible upper limit for the emission of atmospheric pollutants dictates that less than 0.0002 wt. % of the metal treated should be volatized as aluminum chloride during the process. A sparging gas consisting of a mixture of 4% chlorine and 96% nitrogen is introduced into the aluminum melt in the form of small gas bubbles which are distributed uniformly throughout the entire melt. The melt is sparged continuously, without interruption, until the desired 1 ppm sodium concentration is reached in the metal. The chronology of the sparging process as a function of the sparging gas spent is given by the following data:

At high sodium concentrations in the melt, i.e. in the early stages of the process, substantially all chlorine in the sparging gas is consumed by sodium, aluminum chloride emission being negligible. As the sodium content of the metal approaches 10 ppm, aluminum chloride appears in the effluent gas. This point is reached after the injection of 12.8 cu. ft. sparging gas/ton aluminum. At this point in the process, the stoichiometric ratio has decreased from 2 to 1.96 atom Na/Cl$_2$ and the effluent gas contains 0.044% AlCl$_3$. As sparging of the melt continues, the sodium concentration in the metal is progressively reduced and the aluminum concentration in the effluent gas increases. After the injection of 15.2 cu. ft. sparging gas/ton, the sodium concentration is reduced to 5 ppm, and the concentration of AlCl$_3$ increases to 0.08% due to the slight decrease in the stoichiometric ratio to 1.94 atom Na/Cl$_2$. The desired final sodium level of 1 ppm is reached after 18.6 cu. ft. sparging gas/ton has been injected into the melt whereupon gas injection is halted. At this final point the aluminum chloride concentration in the effluent gas reaches 0.31% and the stoichiometric ratio has decreased to 1.76 atom Na/Cl$_2$.

The amount of aluminum volatized during the process is determined conservatively from the highest aluminum chloride concentration in the effluent gas which was 0.31% at the end point. The volume of the effluent gas is estimated at 18 cu. ft./ton from the amount of sparging gas spent and based on the high stoichiometric ratios which indicate that the 4% chlorine in the sparging gas was essentially all consumed by sodium in the metal. From these data the maximum $AlCl_3$ emission is calculated as $18 \times 0.31/2000 = 0.028$ cu. ft. $AlCl_3/100$ lbs. aluminum treated which corresponds to an aluminum volatilization rate of $0.0028 \times 0.07$ lb. Al/cu. ft. $AlCl_3 = 0.0002$ wt. % of the metal processed. Since this rate was calculated from the maximum $AlCl_3$ present in the effluent gas at the end point, it is apparent that the integrated amount of aluminum volatized during the process was less than the permissible upper limit of 0.0002 wt. %. Moreover, the final stoichiometric ratio of 1.76 atom $Na/Cl_2$ reflects a high utilization of the chlorine in the sparging gas, a stoichiometric ratio above 1.5 being generally considered desirable.

An increase in the aluminum chloride concentration of the effluent gas with decreasing sodium levels in the metal is unavoidable if a sparging gas with a fixed halogen concentration is used during the entire process. When air pollution standards limit the emission of pollutants in terms of a maximum concentration of pollutants which cannot be exceeded in the effluent gas at any time during the process, the halogen content of the sparging gas should be adjusted with respect to the final, low sodium concentration aimed at in the metal when the concentration of aluminum chloride in the effluent is at its maximum. In such case, using a sparging gas with a fixed chlorine concentration may be economically undesirable since the high degree of dilution required in the sparging gas to offset the effect of poor chlorination selectivity in the metal at the endpoint amounts to a waste of inert gas during virtually the entire sparging process except for the period at the end of the blow. Accordingly, improved gas economy can be achieved by sparging the metal with a sparging gas of varying composition so that the concentration of chlorine in the gas is kept at the highest possible level at every stage of the blow so as to maximize the selective chlorination of sodium while making certain that the concentration of aluminum chloride never exceeds the permissible limit in the effluent gas.

Figure 3:
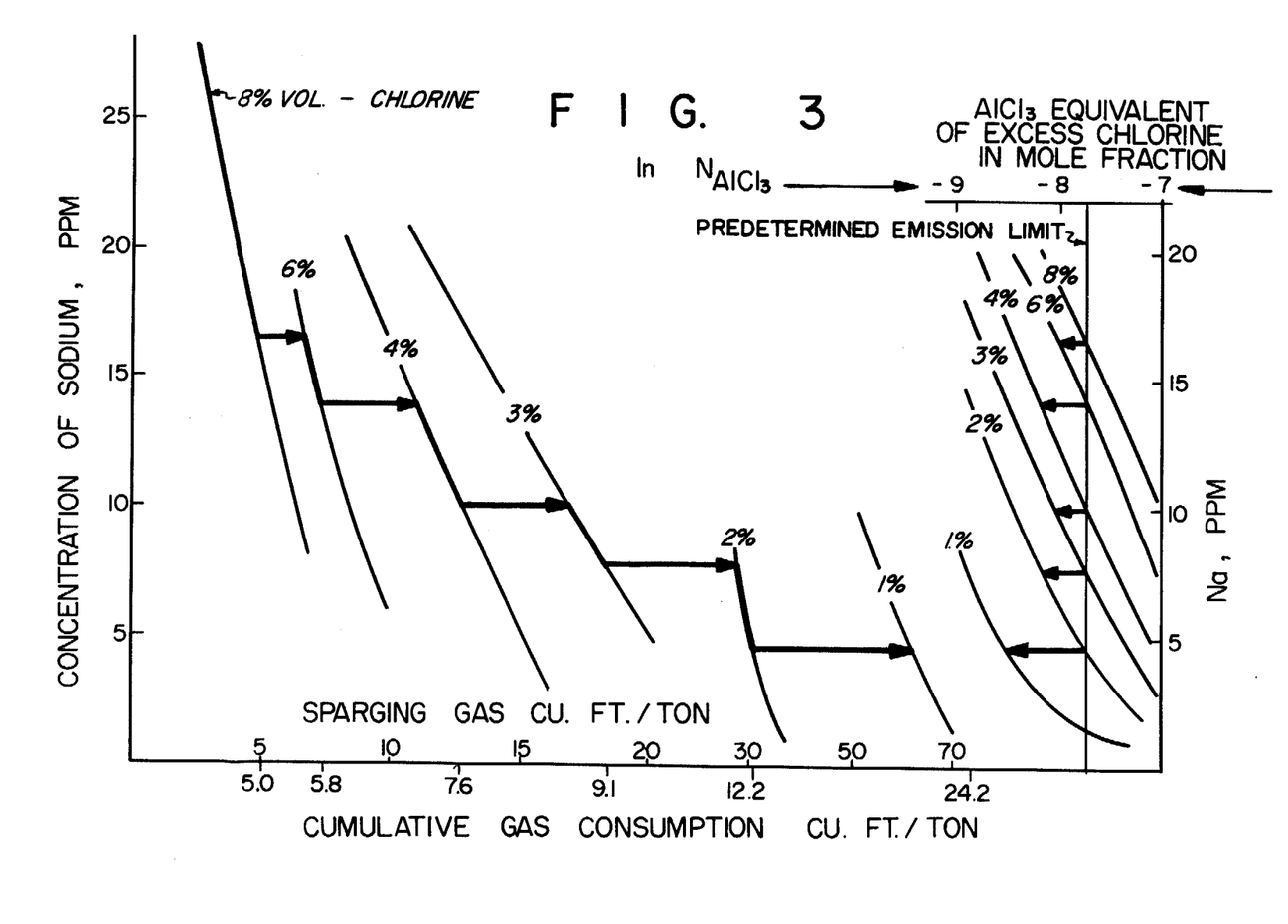
FIG. 3 illustrates a 6-step programmed reduction of the chlorine concentration in the sparging gas for reducing the concentration of sodium in 1 ton of aluminum from 40 ppm to 1 ppm while maintaining the emission of aluminum chloride below a predetermined limit.

The principles of such a programmed sparging process are explained in FIG. 3. In this figure the curves presented in FIG. 2 are reproduced in the center of the drawing showing the sparging gas requirement for reducing the sodium impurity in an aluminum melt from 40 ppm to the desired low levels. The family of curves plotted at the right side of the diagram present a correlation between the excess chlorine in the gas mixture which does not react with sodium during sparging and the sodium concentration in the melt. The unreacted chlorine is expressed in terms of the equivalent concentration of $AlCl_3$ in the spent gas (see horizontal scale at top of drawing). As seen from these curves, the greater the chlorine concentration in the mixture, the greater the mole fraction equivalent of $AlCl_3$ formed in the effluent gas at any given level of sodium impurity in the melt. This directly reflects the effect of chlorine concentration on selectivity, previously illustrated in FIG. 1. The curves also clearly show the effect of sodium concentration on the aluminum chloride concentration in the effluent gas when the metal is treated with a sparging gas of fixed chlorine concentration. Thus, as the sodium level in the melt decreases, the aluminum chloride concentration increases (the natural logarithm of $N_{AlCl_3}$ is shifted toward lower negative values on the top horizontal scale).

The optimization of the sparging process by a programmed blow constitutes a preferred embodiment of the present invention which is illustrated by the following example.

EXAMPLE 2

The sodium content of an aluminum melt is reduced from 40 ppm to 1 ppm by a step-wise reduction of the chlorine concentration of a sparging gas in which the inert carrier gas is argon. The permissible limit of aluminum chloride emission from the bath is 0.043 volume % in the effluent gas, a concentration which may not be exceeded at any time during the sparging process.

Referring to FIG. 3, the predetermined emission limit is represented by the vertical line drawn across the family of curves on the right-hand side of the diagram at $\ln N_{AlCl} = 7.75$ (corresponding to a mole fraction of 0.00043 aluminum chloride). The sparging gas is introduced into the body of the metal bath in the form of well distributed gas bubbles in order that the gas be well equilibrated with the melt during the residence time of the bubbles therein. As indicated by the horizontal arrows in FIG. 3, sparging of the aluminum bath is initiated with a gas mixture containing 8% chlorine and is continued until the predetermined emission limit is reached in the effluent gas. At this point the sodium concentration in the metal is 16.6 ppm. From the curves at the left of the drawing it is seen that the consumption of the 8% chlorine gas mixture in lowering the sodium level from 40 ppm to 16.6 ppm is 5 cu. ft./ton. The introduction of the 8% chlorine mixture into the melt is then discontinued and a 6% chlorine mixture is introduced into the melt with sparging continuing until, once again, the emission limit is reached corresponding to a sodium level of 14 ppm in the melt. The concentration of chlorine in the mixture is then reduced to 4% and the process is thereafter repeated by continually substituting gas mixtures containing progressively less chlorine (i.e. 3%, 2% and 1% chlorine at sodium levels of 10, 7.6 and 4.6 ppm, respectively) until a final sodium concentration of less than 1 ppm is reached. The cumulative gas consumption during the overall sparging operation is indicated on the lower scale of the abscissa and shows that a total of 24.2 cu. ft. sparging gas/ton of metal was required to reduce the sodium content of the metal from 40 ppm to 1 ppm in this programmed blow during which the concentration of aluminum chloride in the effluent was maintained at all times below the 0.043% limit.

It will, of course, be understood by one skilled in the art that the programmed sparging technique illustrated in Example 2 need not necessarily be carried out in a finite number of steps or stages, but rather, the chlorine content of the sparging mixture may be reduced in a continuous manner. For example, the concentration of chlorine in the gas may be reduced automatically in response to a sensing device which measures the concentration of pollutants in the spent gas leaving the system and continuously monitors the composition of the sparging gas along an optimized path. Alternatively, the optimization and monitoring of the sparging gas composition can be carried out with the aid of a computer which is programmed either for a basic sparging routine or utilizes feedback information from previous heats.

From the standpoint of obtaining a high selectivity for the reaction between the halogen component of the sparging gas and the alkali metal impurities in the melt, the composition of the sparging gas and the mode of physical contact between the sparging gas and the melt are equally important. The melt should be thoroughly and uniformly contacted with the sparging gas in order to approach conditions of equilibrium between gas and metal. This is accomplished by introducing the sparging gas in the form of small discrete bubbles which are well distributed throughout the molten metal. Small gas bubbles provide large gas/metal interfacial areas and long gas residence times in the melt, conditions which favor equilibrium and allow the chlorine in the gas mixture to react selectively with sodium. A uniform distribution of the gas bubbles in the metal reduces the chances of bubble coalescence and prevents concentration stratifications in the melt; that is, the localized depletion of sodium around bubble columns or gas channels. The result of such concentration stratification is that the sparging gas is contacted with a vertical stratum of metal which contains sodium at a lower concentration than the metal elsewhere in the bath and consequently the conditions for selectively chlorinating sodium in aluminum are adversely affected. For this reason the gas bubbles should be uniformly distributed both in depth and across the cross section of the metal bath. Any method of gas injection which satisfies this requirement and is capable of producing small discrete gas bubbles in the aluminum melt is suitable for practicing the present invention. A rotary gas injection device such as disclosed in U.S. Pat. No. 3,743,263 is preferred for this purpose.

Figure 4:
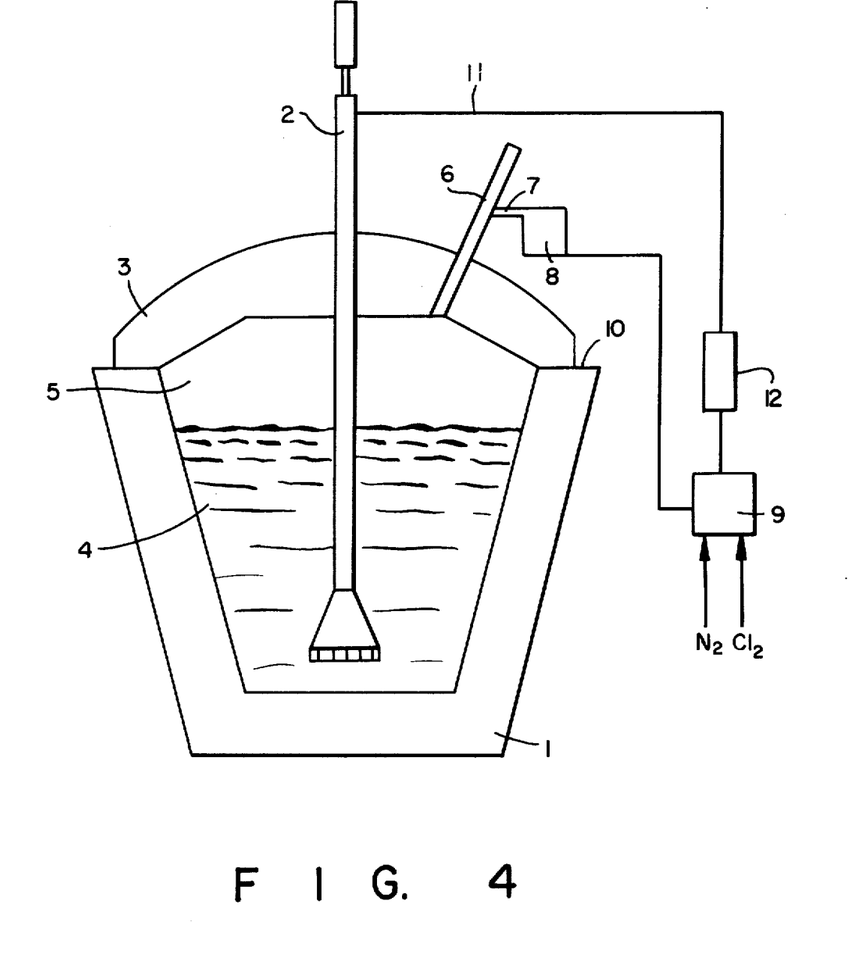
FIG. 4 is a schematic drawing of a system suitable for practicing the present invention.

The process of the invention can be carried out in any type of vessel which allows the introduction of a sparging gas into molten aluminum in the described manner and which can be sealed during the process with a lid containing an exit port for the withdrawal of the effluent gas, preferably in an undiluted form for control process. Ladles, such as syphon ladles or transfer ladles which are generally used for transporting primary aluminum from the pot lines to the cast house can be transformed into a treating system by relatively simple modifications such as shown in FIG. 4. The system comprises an insulated ladle 1 which is provided with a lid 3 resting upon flange sections 10 of ladle 1. A gas-tight seal is provided between ladle 1 and lid 3 so as to allow the withdrawal of the effluent gas without the interference of infiltrated air. A rotary gas injection device 2 capable of injecting gas at high flow rates into the melt in the form of small well-distributed gas bubbles is fastened to lid 3 and supported therefrom.

A sparging gas comprising a halogen, such as, chlorine, and an inert gas, such as, nitrogen is conducted through line 11 and injected into the unalloyed aluminum melt 4 by gas injector 2 which disperses the gas throughout the melt in the form of small bubbles. After passing through the molten metal, the effluent gas collects in head space 5 and is vented from the system through conduit 6. Conduit 6 communicates via branch 7 with gas sensing device 8 which continuously measures the concentration of pollutants in the effluent gas discharged from ladle 1. Sensing device 8 is electrically coupled to the automatic valves of mixing chamber 9 so that the concentration of chlorine in the sparging gas is increased or decreased in chamber 9 in response to the output signal from the sensing device 8. The flow rate of the sparging gas supplied to the melt is measured by meter 12. Sparging of the metal is stopped when the requisite amount of sparging gas has been introduced into the system.

What is claimed is:

1. A method of removing alkali metal impurities from aluminum while substantially avoiding the emission of environmentally harmful gases and fumes comprising the steps of:
   1. providing a vessel for treating molten aluminum, said vessel being provided with inlet means for introducing gas into the molten aluminum and gas outlet means for withdrawal of the effluent gas from the vessel,
   2. introducing molten aluminum essentially free from alloying constituents prior to the addition of any alloying constituents thereto into said vessel,
   3. introducing a sparging gas comprising a mixture of a gas selected from the group consisting of chlorine, fluorine, halogen-containing compounds and mixtures thereof, and a gas inert with respect to aluminum into the molten bath in the form of discrete well-distributed gas bubbles so that said gas bubbles come into intimate contact with substantially the entire mass of molten aluminum in said metal bath,
   4. maintaining the concentration of halogen in said sparging gas at a value such that as the concentration of alkali metal impurities in the melt is progressively reduced the selective halogenation of said impurities relative to aluminum at any given level of alkali metal impurity is sufficiently high to restrict the concentration of aluminum halide in the effluent gas below a predetermined permissible limit, and
   5. maintaining the flow of said sparging gas into said molten aluminum for a period of time sufficient to lower the concentration of alkali metal impurities in said aluminum to the desired level whereby said alkali metal impurities are removed as halides at a sufficiently high utilization of the halogens and halogen-containing compounds such that the effluent gas contains substantially no unreacted fluorine or chlorine and its concentration of aluminum halide is below the predetermined permissible limit.

2. A method of removing alkali metal impurities from aluminum while substantially avoiding the emission of environmentally harmful gases and fumes comprising the steps of:
   1. providing a vessel for treating molten aluminum, said vessel being provided with inlet means for introducing gas into the molten aluminum and gas outlet means for withdrawal of the effluent gas from the vessel,
   2. introducing molten aluminum essentially free from alloying constituents prior to the addition of any alloying constituents thereto into said vessel,
   3. introducing a sparging gas comprising a mixture of chlorine and a gas inert with respect to aluminum into the molten bath in the form of discrete well-distributed gas bubbles so that said gas bubbles come into intimate contact with substantially the entire mass of molten aluminum in said metal bath,
   4. maintaining the concentration of chlorine in said sparging gas at a value such that as the concentration of alkali metal impurities in the melt is progressively reduced, the selective chlorination of said impurities relative to aluminum at any given level of alkali metal impurity is sufficiently high to restrict the concentration of aluminum chloride in the effluent gas below a predetermined permissible limit, and 5. maintaining the flow of said sparging gas into said molten aluminum for a period of time sufficient to lower the concentration of alkali metal impurities in said aluminum to the desired level, whereby said alkali metal impurities are removed as halides at a sufficiently high chlorine utilization such that the effluent gas contains substantially no unreacted chlorine and its concentration of aluminum chloride is below the predetermined permissible limit.

3. A method as in claim 2 wherein the concentration of chlorine in the gaseous mixture is progressively reduced during refining so as to minimize the requirement of said inert gas while restricting the concentration of aluminum chloride in said effluent gas below said predetermined limit.

4. A method as in claim 2 wherein the stoichiometric ratio of sodium atoms removed per mole of chlorine is greater than 1.5.

5. A method as in claim 2 wherein said inert gas is nitrogen.

6. A method as in claim 2 wherein said inert gas is argon.

7. A method as in claim 2 wherein said sparging gas contains up to about 10%, by volume, chlorine.

8. A method as in claim 2 wherein said sparging gas is introduced into the molten aluminum through a rotary gas injector.

* * * * *